UNITED STATES PATENT OFFICE 2,479,951

OIL-MODIFIED ALKYD RESIN MANUFACTURE

Paul E. Marling, Dayton, Ohio, assignor to Monsanto Chemical Company, St. Louis, Mo., a corporation of Delaware No Drawing. Application January 18, 1946, Serial No. 642,135

5 Claims. (Cl. 260—22)

The present invention relates to oil-modified alkyd resins and more particularly to alkyd resins prepared from fatty oils, glycerine and phthalic anhydride.

Oil-modified alkyd resins have been previously prepared by a variety of methods and I have found that a most expedient method is that described in the Robinson Patent No. 2,123,206, wherein the fatty oil is incorporated by carrying out an alcoholysis of the oil prior to esterification with the polybasic acid. While this patentee teaches that the alcoholysis may be effected in the presence or absence of a catalyst, I have found that in order to obtain a reaction in a commercially feasible length of time an inorganic base catalyst is necessary. Of the inorganic basic materials disclosed by Robinson, i. e., sodium hydroxide, sodium glycerate and lime, according to my experience the latter yields the most desirable resinous materials with respect to color and time of processing. When sodium glycerate is employed, as in Example 5, the product is a light brown solid, and this is also true of the oily product obtained when conducting the reaction in the presence of sodium hydroxide. When the alcoholysis is conducted in the absence of catalysts, a relatively long reaction time is necessary in order to obtain products of the desired properties. However, when lime is used as the catalyst, the products, though lighter in color than those obtained by using either sodium hydroxide or sodium glycerate as catalyst, are characterized by opacity, which is probably due to the occlusion of dicalcium phthalate in the finished resin.

The object of this invention is to provide a method for decolorizing and clarifying oil-modified alkyd resins obtainable by reaction of phthalic anhydride or other polybasic acid and a mono- or diglyceride of a drying or semi-drying oil which has been prepared by alcoholysis of the said oil in the presence of a polyhydric alcohol and lime.

A more specific object of this invention is to provide a rapid process whereby a light-colored, clear resin may be obtained by the reaction of a fatty glyceride with glycerine and phthalic anhydride when alcoholysis is accelerated by means of lime. It also makes possible the high temperature processing (heating at temperature in excess of 500° F., generally at 550° F.–560° F.) in a considerably shorter period of time and without the development of a dark color in the finished resin.

I have found that the process which comprises the alcoholysis of oils of the drying and semi-drying type with a polyhydric alcohol in the presence of lime and the esterification of the resulting product with a polybasic carboxylic acid to form a resinous ester followed by the addition of phosphoric acid thereto, causes the opacity produced therein to disappear so that subsequently the resin may be processed at a high temperature in order to complete the esterification without the development of color and without the reappearance of opacity in the resin. Esterification is desirably carried to the point where the product has an acid number below 10.

I have found that the addition of 0.2% to 2% by weight of phosphoric acid to the alkyd resin, subsequent to reaction of the alcoholized oil with phthalic anhydride, yields oil-modified alkyd resins which are highly valuable from the standpoint of good color and clarity. The inclusion of any residual phosphoric acid in the alkyd resin has substantially no effect on either the drying property or the flexibility and luster of films prepared therefrom.

The invention is further illustrated, but not limited, by the following examples:

Example 1

A mixture consisting of 150 parts by weight of soya oil, 54 parts of a 98% glycerine and .06 part of lime is processed with agitation at a temperature of 450° F. for 30 minutes in an inert atmosphere. At the end of this time, 108 parts of phthalic anhydride is added to the reaction mixture. The mixture is allowed to attain a temperature of about 450° F. and is then held at this temperature for 10 minutes, whereupon 1.7 parts of 85% phosphoric acid is added to it and processing is continued for 2 hours at a temperature of 550° F.

The oil-modified alkyd resin thus obtained was thinned with mineral spirits to give a solution having 66% solids. This solution had a color of 5 to 6 on the Gardner scale and showed no opacity.

Example 2

In another run employing the same quantities of reaction materials and the same processing conditions, except that no phosphoric acid was added, a similarly thinned solution of the resin product was opaque and had a color of from 8 to 9 on the Gardner scale. In both cases, in the preparation of the resin, processing was continued until the reaction product had an acid value of from 5 to 7.

Example 3

A mixture of 125 parts by weight of linseed oil and 45 parts by weight of 98% glycerine, 0.05 part by weight of lime ($Ca(OH)_2$) is processed with agitation and in the presence of an inert atmosphere of carbon dioxide at a temperature of 450° F. for 30 minutes. At the expiration of this time, the glycerine has reacted with the oil sufficiently to form a mixture of mono- and di-glycerides. 90 parts by weight of phthalic anhydride is now added to the reaction mixture. The mixture is again raised to a temperature of 450° F. and is maintained at this temperature for 10 minutes, whereupon 0.15 part by weight of 85% phosphoric acid is slowly added. The phosphoric acid is desirably added as a solution made by dissolving five volumes of 85% $H_3PO_4$ in 45 volumes of ethyl alcohol. After the acid has been added the temperature is raised to 550° F.–560° F. and maintained at this point for 1¾ hours, after which the product was cooled.

It was observed that before the addition of the phosphoric acid was made the mixture was opaque. This opacity, however, disappeared when the phosphoric acid was added and the product became clear.

The acid value of the finished solid resin was 6.6, the color was 5 to 6 on the Gardner-Holt scale, while the viscosity was K to M (Gardner tubes) measured as a 50% solution in mineral spirits. The resin solution was clear and showed no opacity. The air drying time of the film produced by using a cobalt drier, was 3 hours for a dust-free set, which became fairly hard in 24 hours. The water immersion test of the dried film was satisfactory after 24 hours exposure to water.

Example 4

Another batch of resin was made employing the same quantities of reaction materials and the same processing conditions as described in Example 3 above, except that no phosphoric acid was used. The color of the resin was 9 to 10 on the Gardner-Holt scale and the product was opaque. The acid value of the solids, the viscosity, the drying and water immersion properties of the film were otherwise similar to the product described in Example 3.

For the purpose of alcoholysis of a fatty drying or semi-drying oil, I have found that the rate of such alcoholysis is influenced by the amount of lime present. In a series of experiments made in order to determine the approximate rate of alcoholysis of linseed oil, I heated an agitated mixture containing 336 parts by weight of linseed oil with 81 parts by weight of glycerine at a temperature of 450° F. until one volume of the product was completely soluble in 4 volumes of methyl alcohol. When 0.12% by weight (based on the glycerine) of calcium metal was present as $Ca(OH)_2$, 33 minutes was required to obtain complete solubility. When 0.06% of calcium was present, 32 minutes was required. When the amount of calcium present was reduced to 0.022%, the time required was 64 minutes. In the case of other fatty oils the effect of calcium required was much the same.

The amount of calcium required as a catalyst for alcoholysis is, therefore, somewhat variable, depending largely upon the temperature, the amount of calcium present as calcium hydrate and the time available for reaction, as will be readily understood by those skilled in the art.

While I am uncertain as to the precise reasons for the operation of my present process and, therefore, do not wish to be bound by any particular theory concerning the same, it appears that the amount of phosphoric acid employed should be at least sufficient to combine chemically with the lime present in the resin to form the most basic of the calcium phosphates, which, for the present purpose, may be considered as tricalcium phosphate, $Ca_3(PO_4)_2$. Apparently an excess of phosphoric acid has no adverse effect upon the product, since it appears to become combined in some unknown manner with the constituents of the resin. I have employed as much as 30 times the amount of phosphoric acid required to combine chemically with the lime present to form tricalcium phosphate and have found the resin to be satisfactory in every respect. However, for reasons of economy of material I prefer to employ from 2 to 10 times the amount of $H_3PO_4$ required to form the tricalcium phosphate. Phosphoric acid of any concentration may be used, the commercial grades containing 75% or 85% $H_3PO_4$ being, however, preferred.

As pointed out in the above examples, the acid may conveniently be added as a solution of the same in ethyl alcohol. However, other volatile alcohols such as methyl, propyl, butyl, amyl, etc. may be used in place of ethyl alcohol, this feature merely providing a convenient way for introducing the acid. It is believed that substantially all of the alcohol is volatilized during the subsequent esterification.

As may be apparent to those skilled in the art, the use of an inert atmosphere during the processing is not necessary, modified alkyd resins of fair color are obtainable when the reaction mixture is exposed to air. However, the products obtained when working in air are not of as good a color as when using nitrogen, carbon dioxide, etc. Hence, I prefer to produce the resin in the absence of atmospheric oxygen, by causing the reaction to take place when protected by an inert atmosphere, for example, as by bubbling a rapid stream of carbon dioxide or nitrogen gas through the reaction mixture. Also, as may be appreciated, the ratio of reactants may be varied within certain limits. The oil modifications may be short, medium or long, as may be appreciated by those skilled in the art of alkyd resin manufacture. Phenolic resins or natural resins may be added during the reaction for further modification. The phosphoric acid may also be added in diluted form, for example, as in admixture with ethyl alcohol. Reaction temperatures may be varied from 440° F. to 560° F. Reaction conditions will also vary somewhat with the type of drying, semi-drying or non-drying oil or mixture thereof which may be employed. Besides the oils already mentioned, there may be employed, for example, tung oil, oiticica oil, sun flower seed oil, cottonseed oil, coconut oil, etc.

While the invention is directed particularly to the clarification and decolorization of oil-modified alkyd resins, it is also applicable to the clarification and decolorization of resins prepared from other polyhydric alcohols, and a fatty oil which has been alcoholyzed with lime. For example, instead of glycerine there may be employed pentaerythritol, polyethylene glycol or mannitol or a mixture of these alcohols with glycerine. If desired, there may be employed other dibasic acids or anhydrides instead of the phthalic anhydride herein disclosed, e. g., maleic anhydride, succinic, tartaric, fumaric acid, or succinic anhydride. Mixtures of these anhydrides or acids may also be employed. Monobasic organic acids such as benzoic may also be present during the reaction. My experiments have shown that by the use of the present process, it is possible to obtain oil-modified resins, within a short reaction time, that are much lighter in color and clearer than those obtained by prior methods, the resins thus obtained yielding films which are highly desirable not only from the standpoint of color and clarity, but also with respect to hardness and luster.

As many apparently widely different embodiments of this invention may be made without departing from the spirit and scope thereof, it is to be understood that the present invention is limited only by the appended claims.

What I claim is:

1. The process which comprises the alcoholysis of fatty oils selected from the class consisting of drying and semi-drying oils in the presence of $Ca(OH)_2$ and a polyhydric alcohol selected from the class consisting of glycerine, pentaerythritol, polyethylene glycol and mannitol, the amount of $Ca(OH)_2$ employed being equivalent to between 0.12% and 0.022%, by weight, based on said polyhydric alcohol, of calcium metal contained in said $Ca(OH)_2$, the esterification of the resulting product with a polycarboxylic acid anhydride of the class consisting of phthalic, maleic, succinic, tartaric and fumaric acid followed by the addition of ortho-phosphoric acid thereto, the amount of said phosphoric acid added being between 0.2% and 2.0% by weight of the esterification product and then heating the product to a temperature of from 440° F. to 560° F.

2. The process of preparing an alkyd resin which comprises the alcoholysis of fatty oils selected from the class consisting of drying and semi-drying oils in the presence of $Ca(OH)_2$ with glycerine, the amount of $Ca(OH)_2$ employed being sufficient to furnish from 0.12% to 0.022% by weight, based on said glycerine of calcium metal as $Ca(OH)_2$ and then esterifying the resulting product with phthalic anhydride, said esterification being carried to the point where said product has an acid number below 10, then adding ortho-phosphoric acid thereto, the amount of phosphoric acid added being between 0.2% and 2.0% by weight of the esterification product and then heating the product to a temperature of from 440° F. to 560° F.

3. The process of preparing a resin which comprises the alcoholysis of linseed oil with glycerine in the presence of from 0.12% to 0.022% by weight of calcium metal as $Ca(OH)_2$, then esterifying the resulting product with phthalic anhydride, said esterification being carried to the point where said product has an acid number below 10, then adding ortho-phosphoric acid thereto, the amount of phosphoric acid added being between 0.2% and 2.0% by weight of the esterification product and then heating the product to a temperature of from 440° F. to 560° F.

4. The process of preparing a resin which comprises the alcoholysis of soya oil with glycerine in the presence of from 0.12% to 0.022% by weight of calcium metal as $Ca(OH)_2$, then esterifying the resulting product with phthalic anhydride, said esterification being carried to the point where said product has an acid number below 10, then adding ortho-phosphoric acid thereto, the amount of phosphoric acid added being between 0.2% and 2.0% by weight of the esterification product and then heating the product to a temperature of from 440° F. to 560° F.

5. The process of preparing a resin which comprises the alcoholysis of soya oil with glycerine in the weight proportions of 150 parts of soya oil to 54 parts of glycerine in the presence of 0.06 part of $Ca(OH)_2$, the esterification of the resulting product by 108 parts of phthalic anhydride followed by the addition of 1.7 parts by weight of 85% ortho-phosphoric acid thereto after which the product is heated to a temperature of from 440° F. to 560° F.

PAUL E. MARLING.

REFERENCES CITED

The following references are of record in the file of this patent:

UNITED STATES PATENTS

| Number | Name | Date |
|---|---|---|
| 1,995,954 | Albrecht | Mar. 26, 1935 |
| 2,123,206 | Robinson | July 12, 1938 |